United States Patent
Chen

(10) Patent No.: US 7,939,964 B2
(45) Date of Patent: May 10, 2011

(54) MODULARIZED POWER SUPPLY SWITCH CONTROL STRUCTURE

(75) Inventor: Yu-Cheng Chen, Taipei Hsien (TW)

(73) Assignee: Zippy Technology Corp., Hsin-Tien, Taipei Hsien (TW)

( * ) Notice: Subject to any disclaimer, the term of this patent is extended or adjusted under 35 U.S.C. 154(b) by 72 days.

(21) Appl. No.: 11/882,538

(22) Filed: Aug. 2, 2007

(65) Prior Publication Data

US 2009/0033151 A1    Feb. 5, 2009

(51) Int. Cl.
*H02J 5/00*    (2006.01)
*H02J 1/00*    (2006.01)

(52) U.S. Cl. ............... 307/41; 307/11; 307/31; 307/38; 307/39

(58) Field of Classification Search ............ 307/11, 307/30, 31, 38–41, 42
See application file for complete search history.

(56) References Cited

U.S. PATENT DOCUMENTS

| | | | | |
|---|---|---|---|---|
| 3,984,699 A * | 10/1976 | Bailey | ............... | 307/41 |
| 4,216,384 A * | 8/1980 | Hurley | ............... | 307/39 |
| 4,626,697 A * | 12/1986 | Nelson | ............... | 307/18 |
| 4,769,555 A * | 9/1988 | Pequet et al. | ............... | 307/141 |
| 4,878,164 A * | 10/1989 | Colombo | ............... | 363/49 |
| 5,119,014 A * | 6/1992 | Kronberg | ............... | 323/267 |
| 5,161,241 A * | 11/1992 | Kanai | ............... | 363/65 |
| 5,384,490 A * | 1/1995 | Swartz, Jr. | ............... | 307/38 |
| 5,424,903 A * | 6/1995 | Schreiber | ............... | 361/166 |
| 5,452,197 A * | 9/1995 | Rice | ............... | 363/71 |
| 5,488,218 A * | 1/1996 | Olsen et al. | ............... | 219/492 |
| 5,563,455 A * | 10/1996 | Cheng | ............... | 307/41 |
| 5,978,236 A * | 11/1999 | Faberman et al. | ............... | 363/37 |
| 6,011,329 A * | 1/2000 | McGovern | ............... | 307/141.4 |
| 6,014,325 A * | 1/2000 | Pecore | ............... | 363/126 |
| 6,028,373 A * | 2/2000 | Kim et al. | ............... | 307/31 |
| 6,608,900 B1 * | 8/2003 | Yancey et al. | ............... | 379/413 |
| 7,145,786 B2 * | 12/2006 | Vinciarelli | ............... | 363/17 |
| 7,266,709 B2 * | 9/2007 | Chapuis et al. | ............... | 713/300 |
| 7,315,156 B2 * | 1/2008 | Chapuis | ............... | 323/282 |
| 2003/0088795 A1 * | 5/2003 | Schwartz | ............... | 713/300 |
| 2005/0094330 A1 * | 5/2005 | Guenther et al. | ............... | 361/18 |
| 2007/0132316 A1 * | 6/2007 | Joos et al. | ............... | 307/31 |
| 2007/0234095 A1 * | 10/2007 | Chapuis et al. | ............... | 713/340 |
| 2008/0054990 A1 * | 3/2008 | Shieh et al. | ............... | 327/536 |

FOREIGN PATENT DOCUMENTS

TW    1260848 B    8/2006

* cited by examiner

*Primary Examiner* — Jared J Fureman
*Assistant Examiner* — Adi Amrany
(74) *Attorney, Agent, or Firm* — Muncy, Geissler, Olds & Lowe, PLLC

(57) ABSTRACT

A modularized power supply switch control structure aims to control a main power system of a power supply. The main power system includes at least one high voltage output unit at a high voltage output end and one low voltage output unit at a rear low voltage output end. A control unit is connected to the high voltage output unit and the low voltage output unit to control start/stop time series of the high voltage output unit and the low voltage output unit so that the high voltage output unit and the low voltage output unit can be started asynchronously. Thus the power supply can output a start voltage at the start instant to meet load requirement. A plurality of power output modules deliver output asynchronously. Hence output current or voltage surge at the start instant can be improved.

10 Claims, 4 Drawing Sheets

MODULARIZED POWER SUPPLY SWITCH CONTROL STRUCTURE

FIELD OF THE INVENTION

The present invention relates to a modularized power supply switch control structure and particularly to a method and a circuit structure to control asynchronous start/stop sequence of a plurality of power supply modules in a power supply.

BACKGROUND OF THE INVENTION

A conventional power supply, referring to FIG. 1, includes an EMI filter unit 2, a commutation unit 3, a power factor correction circuit 4, a standby power system 5, a pulse width modulation (PWM) unit 6 and a main power system 7. A first switch unit 11 is provided to control ON/OFF between the power supply and an AC power input source 9. The standby power system 5 is connected to a second switch unit 12 to control operation of the PWM unit 6. The main power system 7 has at least one high voltage output end (shown by +12V in FIG. 1) and at least one low voltage output end (shown by +5V and +3.3V in FIG. 1). However, the standby power system and the main power system do not adopt a modular power output structure. To provide different output watts design of element parameters of the standby power system or main power system has to be done anew. And there is no expandability. To improve the design of power supply and compatibility of the power supply of the same series, R.O.C. Patent No. 1260848 entitled "Chain control circuit for parallel power supply" includes a plurality of parallel power supplies connecting to a control unit through a power supply switch unit. The power supply switch unit issues signals so that the control unit orders the parallel power supplies to deliver output at the same time. The parallel power supplies also can output rated watts as deigned. Such a design can accumulate output watts of the power supplies to meet requirements. The number of the parallel power supplies can be increased or decreased to alter the output watts. Hence design of the power supply is more flexible and can be done faster. Repairs and maintenance also are simpler. However, ON/OFF of the power supplies are done at the same time under the order of the control unit. When the parallel power supplies are started simultaneously, an inrush current is generated that might cause damage of computer elements or trigger a protection mechanism to make the computer elements not able to start normally. There is still a need to control output of a plurality of power supplies coupled in parallel.

SUMMARY OF THE INVENTION

In view of the shortcomings occurred to the conventional power supply and prior art set forth above, the primary object of the present invention is to provide a method and a circuit structure to control start/stop time series of a plurality of power supply modules in a power supply to improve the phenomenon of inrush current at the instant of power ON period.

The invention provides a modularized power supply switch control structure to control a main power system of a power supply. The main power system includes at least a high voltage output unit at a high voltage output end and a low voltage unit at a rear low voltage output end. The high voltage output unit includes at least one first power output module. The low voltage unit includes at least one second power output module connecting to at least one DC/DC converter. It also has a control unit connecting to the high voltage output unit and the low voltage output unit to control start/stop time series of the high voltage output unit and the low voltage output unit so that they are started asynchronously. The instantaneous output voltage of the power supply can meet the requirement of the start voltage of a load to allow the load to be started normally. As the power supply modules do not deliver output at the same time, output current or voltage surge at the instant of start period can be improved.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
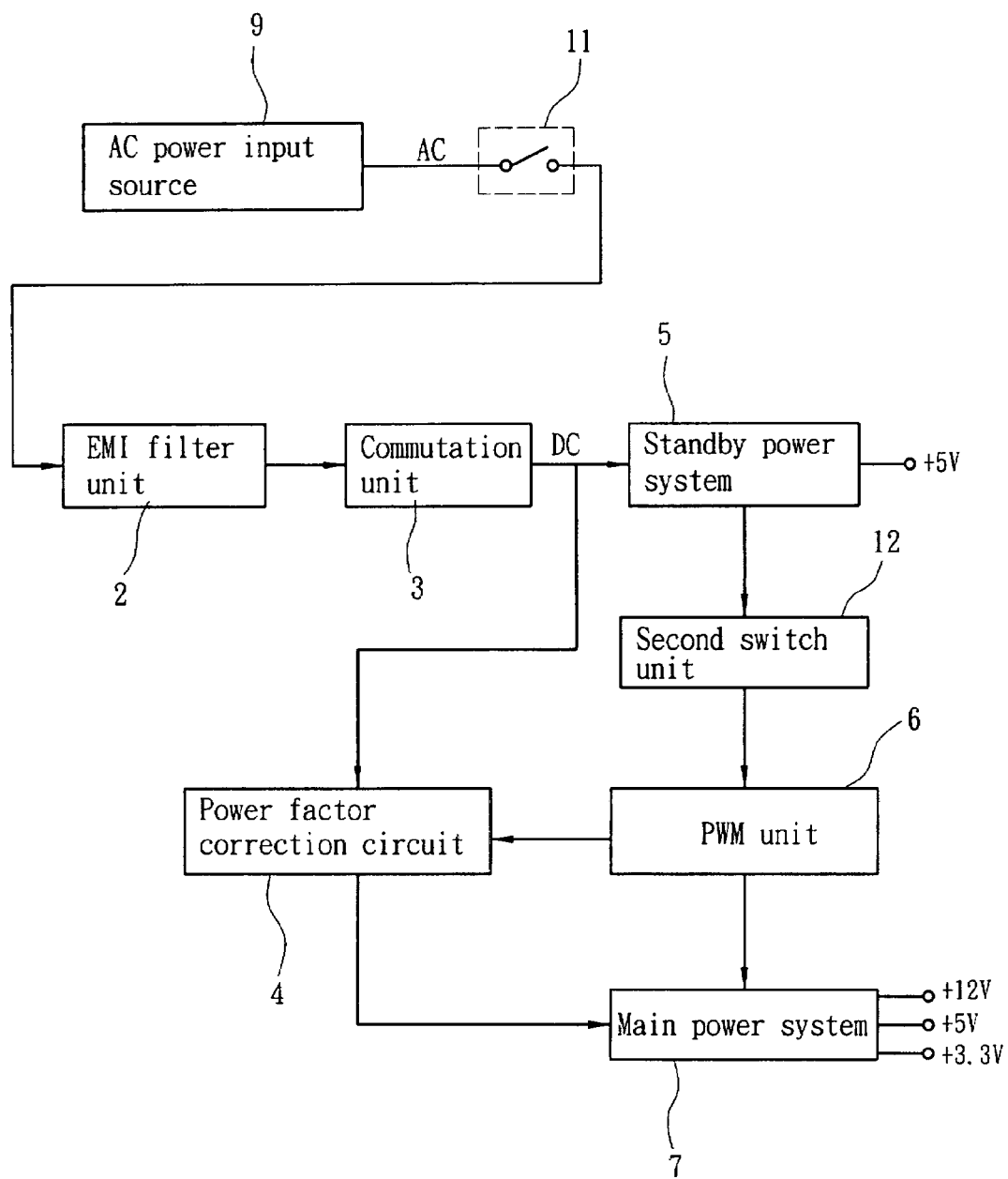
FIG. 1 is a block diagram of a conventional power supply structure.
Figure 2:
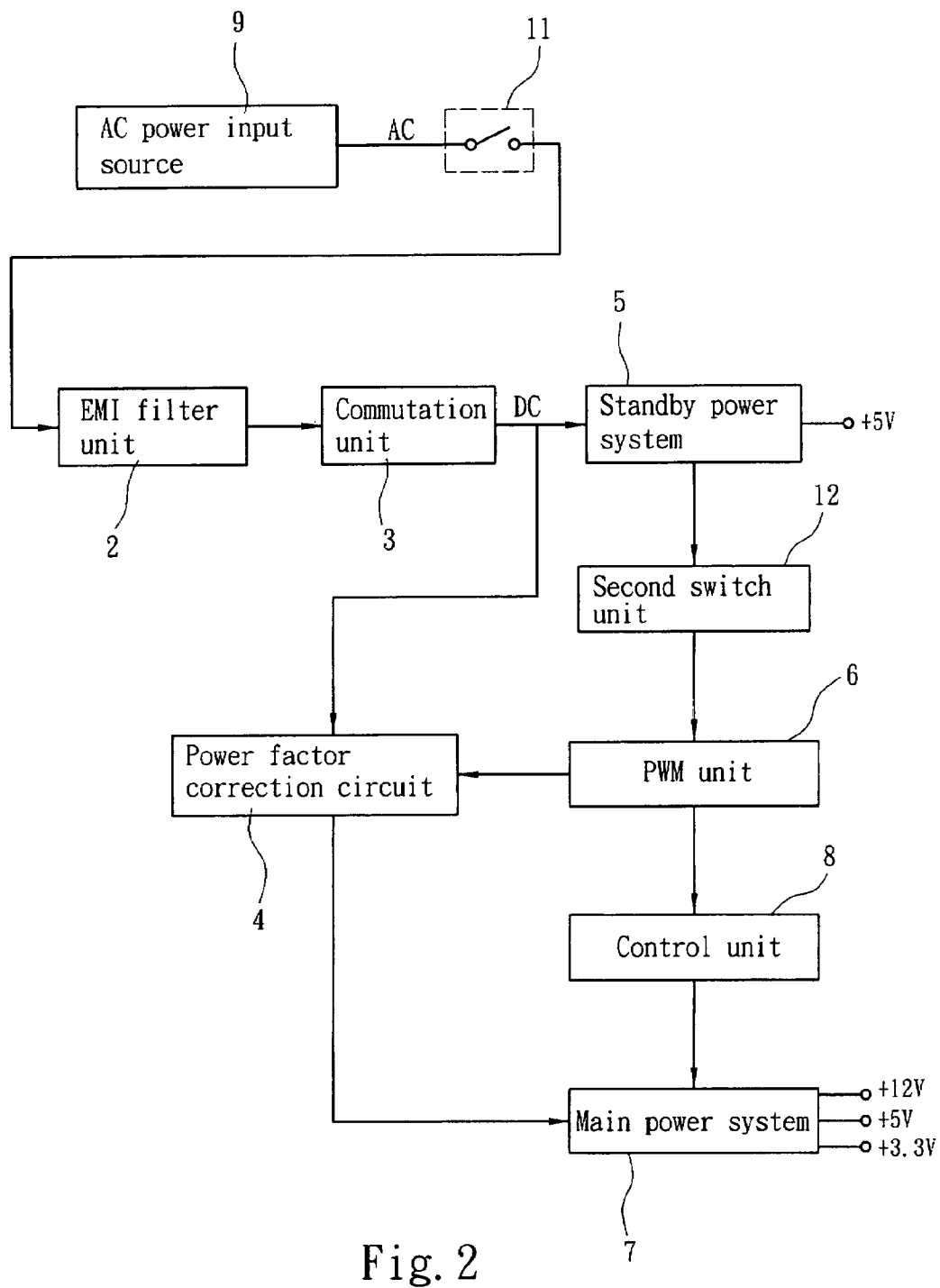
FIG. 2 is a block diagram of the invention.
Figure 3:
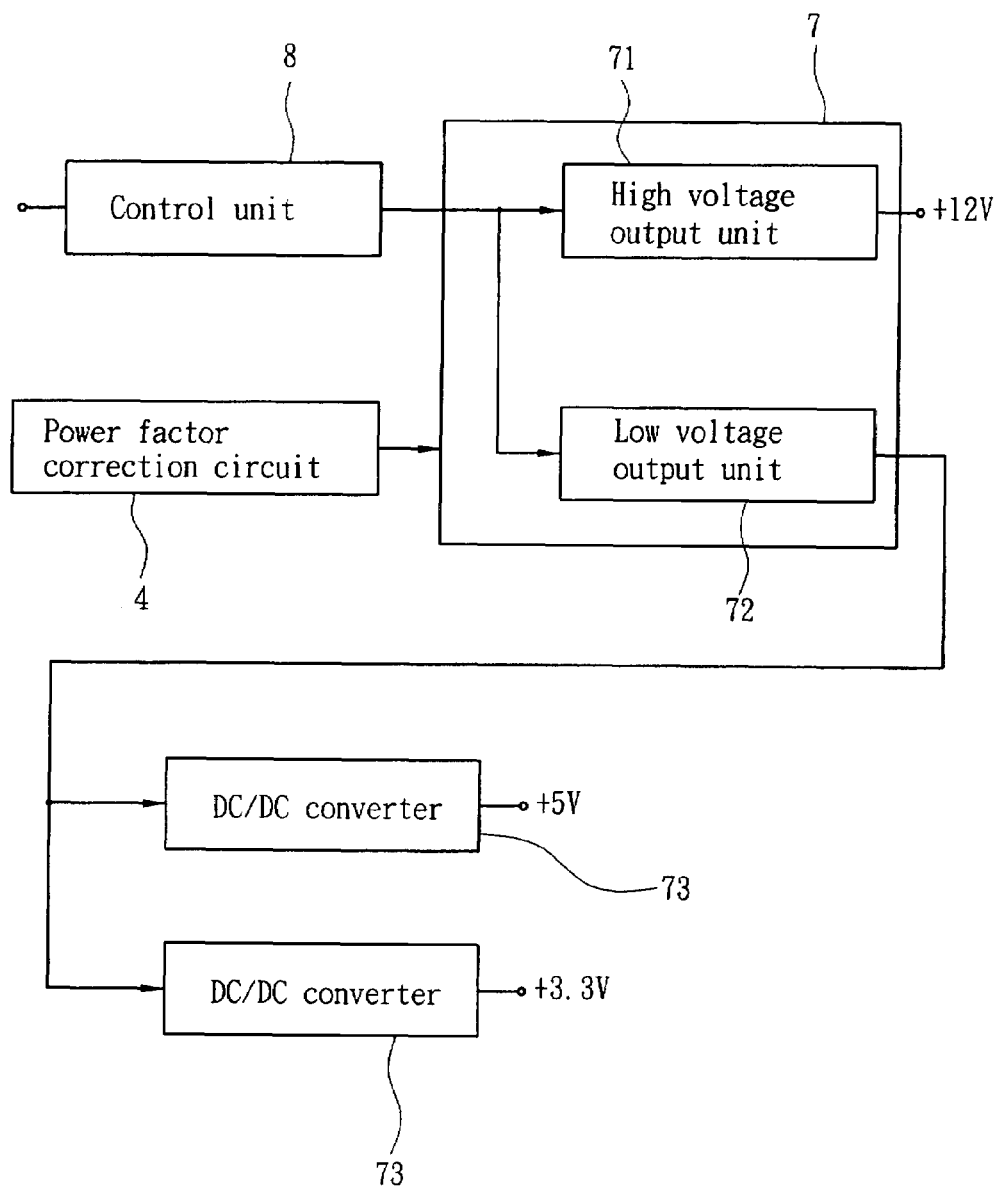
FIG. 3 is a circuit block diagram of the invention.

Please refer to FIGS. 2 and 3 for an embodiment of the invention. The invention is adopted for use on a power supply which is connected to an AC power input source 9. ON/OFF of the AC power is controlled through a first switch unit 11 to provide input power of the power supply through an EMI filter unit 2 and a commutation unit 3 to start a standby power system 5. The standby power system 5 provides power through a second switch unit 12 to start a PWM unit 6. The PWM unit 6 generates a duty cycle signal for a power factor correction circuit 4 and a main power system 7. The power goes through phase regulation through the power factor correction circuit 4 and is sent to the main power system 7. The PWM unit 6 and the main power system 7 are bridged by a control unit 8 which controls start time series of the main power system 7. Referring to FIG. 3, the main power system 7 includes at least a high voltage output unit 71 at a high voltage output end (shown by +12V in FIG. 3) and a low voltage unit 72 at a rear low voltage output end (shown by +5V and +3.3V in FIG. 3). In this embodiment the low voltage output unit 72 is connected to two DC/DC converters 73 to form respectively a low voltage output end of 5V and another low voltage output end of 3.3V. The start time series of the high voltage output unit 71 and the low voltage output unit 72 are controlled by the controlled unit 8. The control unit 8 receives the duty cycle signal of the PWM unit 6 to order the high voltage output unit 71 and the low voltage output unit 72 to start asynchronously. The control unit 8 also sets the start time series of the high voltage output unit 71 and the low voltage output unit 72 so that after the power supply is started, the high voltage output unit 71 or the low voltage output unit 72 can be started after a deferred time period.

Figure 4:
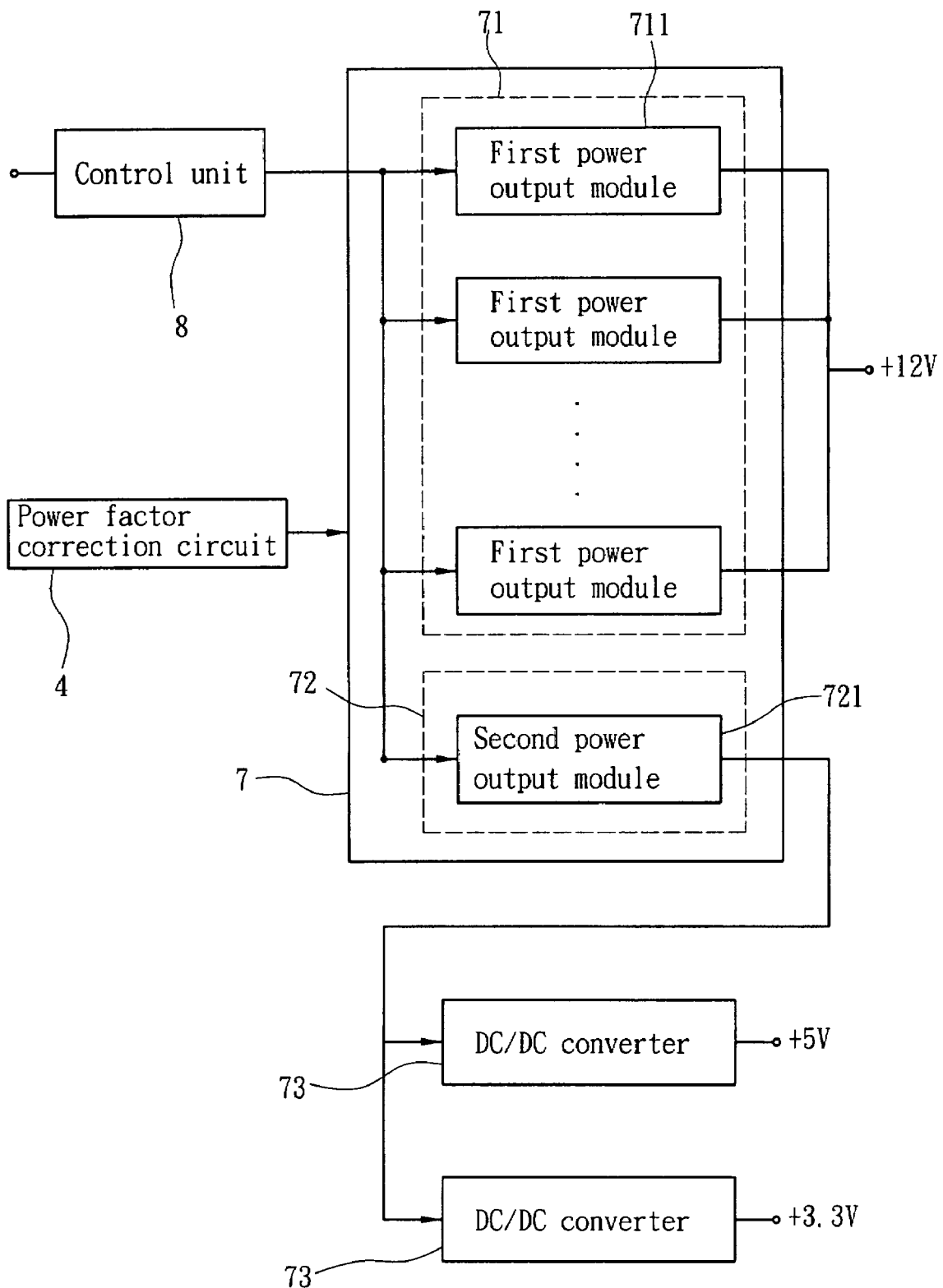
FIG. 4 is a detailed circuit block diagram of the invention.

Referring to FIG. 4, the high voltage output unit 71 includes a plurality of first power output modules 711 coupled in parallel to provide expandability for output power of the main power system 7. The total power of the first power output modules 711 allows a load to function normally. The control unit 8 is connected to each of the first power output modules 711 and controls the start time series thereof so that the first power output modules 711 are started or stopped asynchronously, consequentially power and voltage of the high voltage output unit 71 can be regulated at the start instant of the power supply. As a result the surge voltage at the start instant of the power supply can be improved. The low voltage output unit 72 may include a second power output module 721 or a plurality of second power output modules 721 coupled in parallel. The low voltage output unit 72 has a rear end connecting to at least one DC/DC converter 73 so that the low voltage output end at the rear end can output a lower voltage. The control unit 8 also controls the start time series of the second power output modules 721 so that the low voltage output unit 72 and the high voltage output unit 71 are started or stopped asynchronously. Or the second power output modules 721 are started or stopped asynchronously to regulate output power of the low voltage output unit 72.

As a conclusion, the control unit 8 by controlling asynchronous start or stop of the high voltage output unit 71 and the low voltage output unit 72, also makes the power output modules 711 and 721 to start or stop asynchronously. Thereby output voltage at the start instant of the power supply can be regulated and the shortcoming of voltage surge at the start instant occurred to the conventional techniques can be improved. Moreover, the power output modules 711 and 721 may have different rated output power.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A power supply equipped with a modularized power supply switch control structure, the power supply being connected with an AC power input source to obtain an input power, the power supply comprising:

a standby power system supplying power to start a pulse width modulation which generates a duty cycle signal;

a power factor correction circuit receiving the duty cycle signal, regulating a phase of the input power, and producing an output;

a main power system receiving the output of the power factor correction and including a high voltage output unit and a low voltage output unit, the high voltage output unit delivering high voltage DC power through a high voltage output end, and the low voltage output unit delivering low voltage DC power through a low voltage output end; and a control unit connecting to the high voltage output unit and the low voltage output unit and receiving the duty cycle signal of the pulse width modulation to order the start time of the high voltage output unit and the low voltage output unit to start asynchronously, with one of the output units having a deferred start time and the other output unit having a non-deferred start time while staying on together, until a power requirement is reached, so as to avoid surge voltages at a start instant of the power source.

2. The power supply of claim 1, wherein the high voltage output unit includes a first power output module.

3. The power supply of claim 1, wherein the high voltage output unit includes a plurality of first power output modules coupled in parallel.

4. The power supply of claim 3, wherein the control unit is connected to at least two parallel first power output modules and controls start/stop of each first power output module and generates start/stop time series to allow the first power output modules to start or stop at different times while staying on together, until a power requirement is reached, so as to avoid surge voltages.

5. The power supply of claim 3, wherein the first power output modules have different rated output power.

6. The power supply of claim 1, wherein the low voltage output unit includes a second power output module.

7. The power supply of claim 1, wherein the low voltage output unit includes a plurality of second power output modules coupled in parallel.

8. The power supply of claim 7, wherein the control unit is connected to at least two parallel second power output modules and controls start/stop of each second power output module and generates start/stop time series to allow the second power output modules to start or stop at different times while staying on together, until a power requirement is reached, so as to avoid surge voltages.

9. The power supply of claim 7, wherein the second power output modules have different rated output power.

10. The power supply of claim 1, wherein the low voltage output unit is connected to at least one DC/DC converter.

* * * * *